United States Patent [19]

Betts et al.

[11] Patent Number: 4,683,578
[45] Date of Patent: Jul. 28, 1987

[54] AUTOMATIC GAIN CONTROL USING THE EXTREME POINTS OF A CONSTELLATION

[75] Inventors: William L. Betts, St. Petersburgh; Edward S. Zuranski, Largo, both of Fla.

[73] Assignee: Paradyne Corporation, Largo, Fla.

[21] Appl. No.: 752,398

[22] Filed: Jul. 5, 1985

[51] Int. Cl.⁴ .................................. H04L 27/08
[52] U.S. Cl. .................................. 375/98; 375/39; 375/118
[58] Field of Search ............ 375/98, 118, 12, 14, 375/15, 39, 101; 333/18

[56] References Cited

U.S. PATENT DOCUMENTS

| | | | |
|---|---|---|---|
| 3,988,539 | 10/1976 | Motley et al. | 375/39 |
| 4,458,355 | 7/1984 | Motley et al. | 375/99 |
| 4,599,732 | 7/1986 | LeFever | 375/101 |

Primary Examiner—Benedict V. Safourek
Assistant Examiner—M. Huseman
Attorney, Agent, or Firm—Kane, Dalsimer, Sullivan, Kurucz

[57] ABSTRACT

A phase and gain corrector is described for a modem for receiving QAM or PSK-encoded signals. An ideal vector corresponding to the received vector is generated and the difference or error vector is resolved into a radial component in the direction of the ideal vector a tangential component. A gain corrector and a phase corrector variable are calculated from said radial and tangential components of the error vector and used to correct the gain and phase of the received signals. A secondary detector is also used to detect signals corresponding to extreme points of the signal constellation. The output of the secondary detector is used to modify the gain corrector variable thereby compensating for large gain hits.

3 Claims, 6 Drawing Figures

AUTOMATIC GAIN CONTROL USING THE EXTREME POINTS OF A CONSTELLATION

BACKGROUND OF THE INVENTION

1. Field of Invention

This invention pertains to digital modems and more particularly to a digital modem using QAM type modulation in which an automatic gain control circuit is used with a dynamically changing gain signal dependent on the extreme inner or outer points of the QAM signal constellation.

2. DESCRIPTION OF THE PRIOR ART

While in analog communication systems errors caused by various interferences due to external causes or channel distortions can be usually tolerated, in digital data communications such errors can have grave consequences and therefore great and painstaking efforts have to be made to minimize them. For example many modems are provided with automatic gain control (AGC) circuits which monitor the amplitude levels of the received signals and generate an output to the demodulator section of a receiver. The AGC gain is dynamically adjusted by using the RMS value of the incoming signals to try to maintain said output within a preselected amplitude range. However it was found that for relatively fast excursions of the received signals, these AGC circuits are ineffective even with dynamic equalization.

The shortcomings of the prior art are especially acute in quadrature amplitude modulation systems having relatively large and/or dense signal constellations used for data rates in excess of 14,400 bits per second. The averaging AGC and adaptive equalizers are slow and cannot react fast enough to large gain hits of 2-3 db because the outer points of the signal constellation are shifted towards the columns of the inner points and interpreted incorrectly as error signals. The problem is aggravated in the systems using forward error correction schemes due to the inherent delay in such systems between the received QAM signals and demodulated data signals.

OBJECTIVES AND SUMMARY OF THE INVENTION

In view of the above it is an objective of the present invention to provide a modem with a gain tracking algorithm which automatically compensates for fast rising error signals.

A further objective is to provide a modem with a tracker circuit which is also adapted to reduce gain hit errors.

Other objectives and advantages of the circuit shall become apparent from the following description of the invention.

In a modem constructed in accordance with the present invention, each received signal is compared to an ideal or reference signal and the difference or error signal is resolved into a radial and an angular error component. The angular component is used to rotate the received signals while the radial error is used to compensate for the rapid excursions in the amplitude of the signals and track the gain.

The invention tracks gain hits by adjusting the modem signal gain by a slight amount every time whenever either the innermost or outermost point in each quadrant of the signal constellation is received. More particularly, when the innermost point is received the signal gain is increased by a slight amount and decreased by a slight amount when an outermost point is decoded. The amount of the gain change must be chosen so that it will not cause bit errors in the modem data stream. Since the modem data randomizer/derandomizer circuits will force a psuedo-random distribution of the points in the signal constellation each point is equally likely to occur. During normal data transmission the effects of the slight gain adjustments will be negated over a period of several hundred bauds due to the approximately equal number of inner/outer points received. The occurrence of large gain hits would result in the signal constellation being compressed or expanded which would cause the absence of either the inner or outer points depending on the direction of the gain hit. The absence of the inner or outer points will result in a trend to adjust the gain control in a direction opposite to that of the hit. Over a number of bauds the gain will continue to be adjusted until the modem signal gain has been increased/decreased to a point where the normal signal constellation level is established.

DETAILED DESCRIPTION OF THE INVENTION

Figure 1:
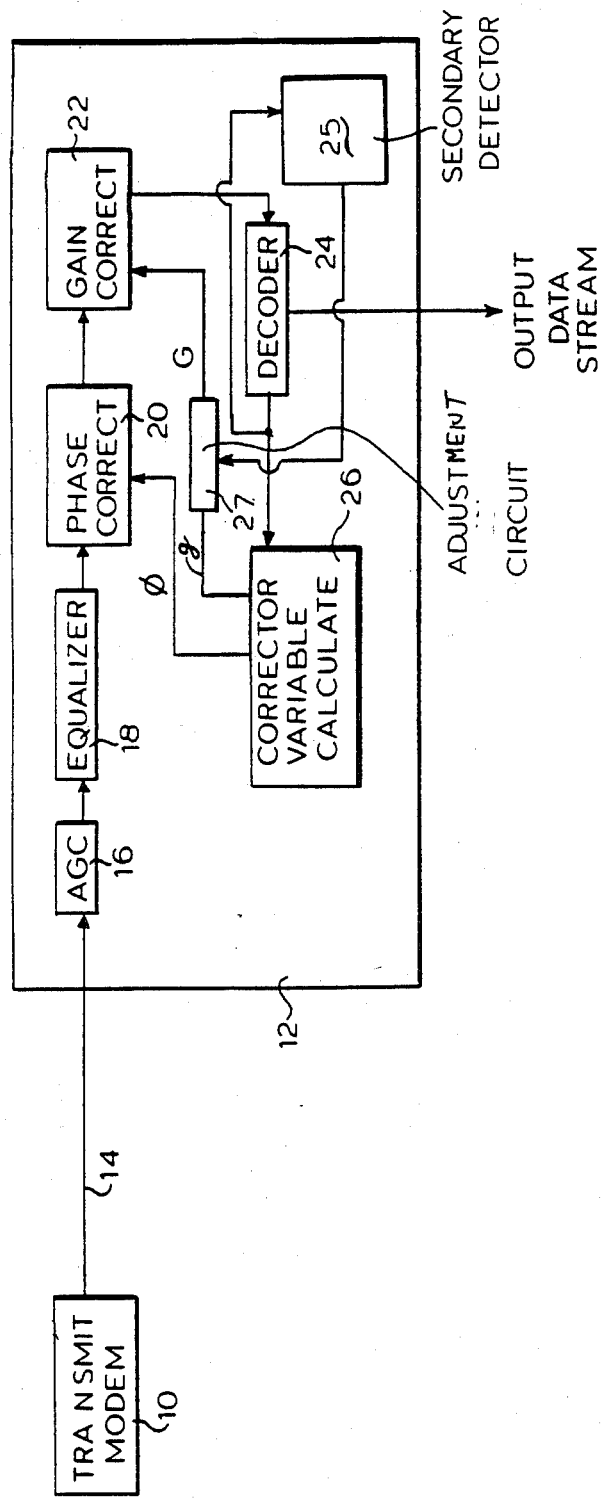
FIG. 1 shows a receiver modem constructed in accordance with the present invention.

Typically digital data is transmitted from a first, transmitting modem 10, to a second, receiving modem 12 over a communication channel 14. While various schemes are presently available, as it shall become apparent from the description below, this invention is directed toward modems using quadrature amplitude modulation. Furthermore, while information can actually flow in both direction over channel 14, for the purposes of this invention, only the signal flow to modem 12 is discussed. Obviously the invention described herein is functional for modems operating in half or full-duplex modes.

Within modem 12, the signals received from channel 14 are first passed through an automatic gain control circuit (AGC) 16, and an adaptive equalizer 18. As previously mentioned the AGC circuit is provided to adjust the amplitude of the received signal so that it falls within a preselected range. The equalizer 18 is provided to eliminate linear channel distortions in a manner well known in the art.

The equalized signals are then fed sequentially to a phase corrector circuit 20 which rotates the equalized signal by a phase angle, which, as shall be described later is dependant on the phase error of the equalized signals. The phase corrected signals are then fed to a gain corrector circuit 22 for correcting the gain of the received signals. The gain corrected signals are fed to a decoder 24. In the decoder 24 the signals are analyzed to determine the ideal or nominal signal vectors that correspond to the received signals and then a binary data stream is generated in the normal manner which corresponds to said ideal signal vectors in accordance with the particular QAM encoding scheme used by the system. The ideal signal vectors are also provided to a corrector variable calculate circuit 26 provided to generate the phase angle corrected variable for phase corrector circuit 20, and an intermediate gain correction variable g.

The ideal vectors from decoder 24 are also fed to a secondary detector 25 for detecting extreme signal constellation points. The output of the secondary detector is used to modify the gain corrector variable from circuit 26, in a gain adjustment circuit 27 to generate a final gain correction variable G for gain corrector circuit 22.

Figure 2:
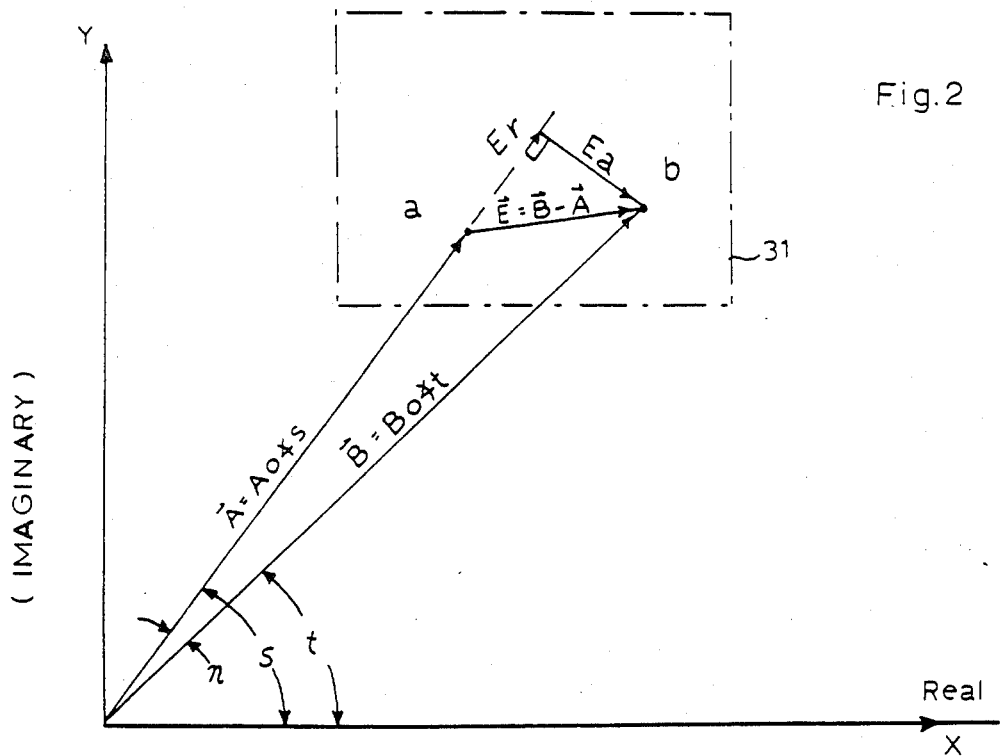
FIG. 2 shows a phasor diagram illustrating a signal received by the modem of FIG. 1, and its relation to an ideal signal and the difference or error signal between the actual and ideal signal.

The means of deriving the gain and phase corrector variable is best explained in conjunction with the phasor diagram of FIG. 2, wherein the horizontal axis is the real axis and the vertical axis is the imaginary axis. Typically the points characterizing a particular QAM-type scheme are mapped on the complex plane as a signal constellation. One such point is point "a" on FIG. 2. For the sake of clarity in FIG. 2 the other points of the constellation have been omitted. A decision area 31 is drawn around point "a" to define the locus of the received signals which correspond to point "a". Thus for example if the decoder 24 of FIG. 1 is fed an equalized signal having components which correspond to point "b" on FIG. 2, then decoder 24 assumes that the signal corresponding to point "a" was sent by modem 10. Thus point "a" represents the ideal or nominal signal and "b" represents the actual received signal.

If the signals are represented by vectors A and B then their difference vector $E = B - A$ corresponds to the error signal. This error vector E can be resolved into two orthogonal components $E_r$ and $E_a$, $E_r$ being the radial error in the direction of ideal vector A and $E_a$ being the tangential error.

Figure 3:
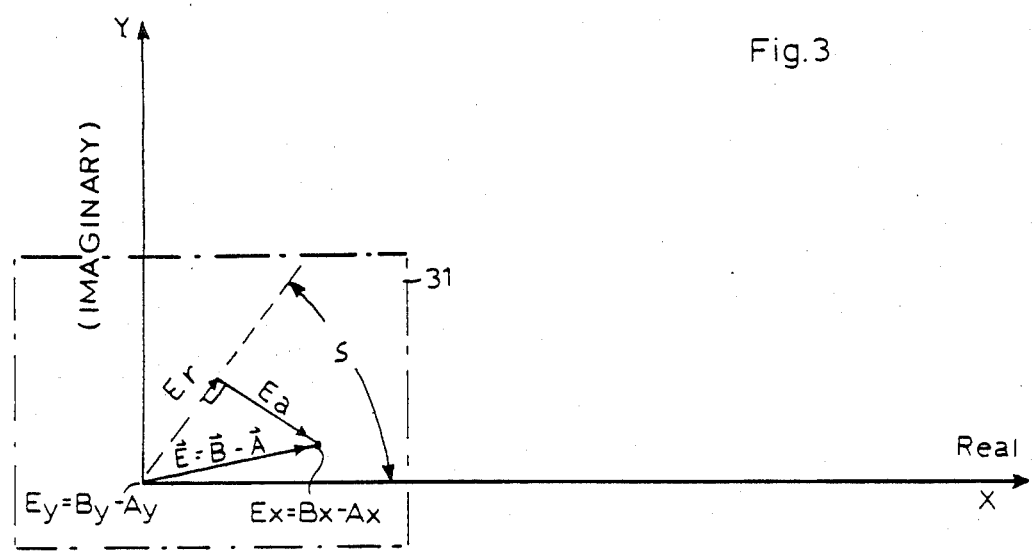
FIG. 3 shows an enlarged section of the diagram of FIG. 2.
Figure 4:
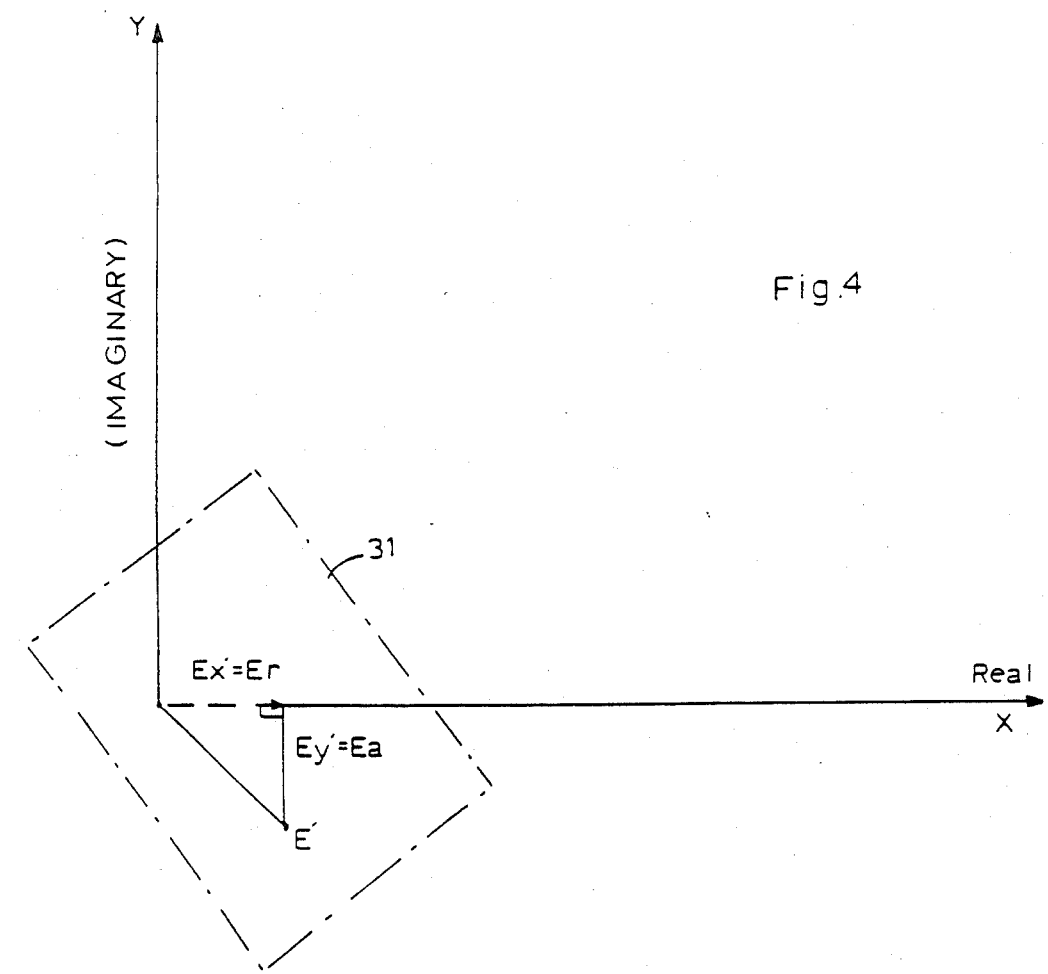
FIG. 4 shows the rotated error vector E'.

As shown in FIG. 3, vector E also has a real and an imaginary component $E_x$ and $E_y$ being defined as $$E_x = B_x - A_x \quad (1)$$

and $$E_y = B_y - A_y \quad (2)$$

wherein $A_x$, $A_y$, and $B_x$, $B_y$ are the real and imaginary components respectively of phasors A and B As shown in FIGS. 2 and 3, phasor A has an angle s. If phasor E is rotated by angle s, as shown in FIG. 4, to obtain a new phasor E', then the real and imaginary components of E' may be obtained as follows:

$$E' = E_x' + jE_y' \quad (3)$$

and $$E' = E\, e^{js} = (E_x + jE_y)(\cos s + j\sin s) =$$
$$= (E_x\cos s - E_y\sin s) + j(E_x\sin s + E_y\cos s) \quad (4)$$

However, since the real and imaginary components of E' are equal to the radial and angular components E as defined above, it follows that $$E_x' = E_r = E_x\cos s - E_y\sin s; \quad (5)$$

and $$E_y' = E_a = E_y\cos s + E_x\sin s. \quad (6)$$

But $E_r$ and $E_a$ are the gain and phase errors of the received signals respectively (if E is much less than A and B) and therefore the instantaneous gain and phase errors g and m may be expressed as $$g = E_xP_x - E_yP_y; \quad (7)$$

and $$m = E_yP_x + E_xP_y \quad (8)$$

where $$P_x = \cos s; \quad (9)$$

and $$P_y = \sin s. \quad (10)$$

These variables are dynamically used by the phase correct circuit 20 and gain correct circuit 22 to minimize the effects of the error in the received signals.

Figure 5:
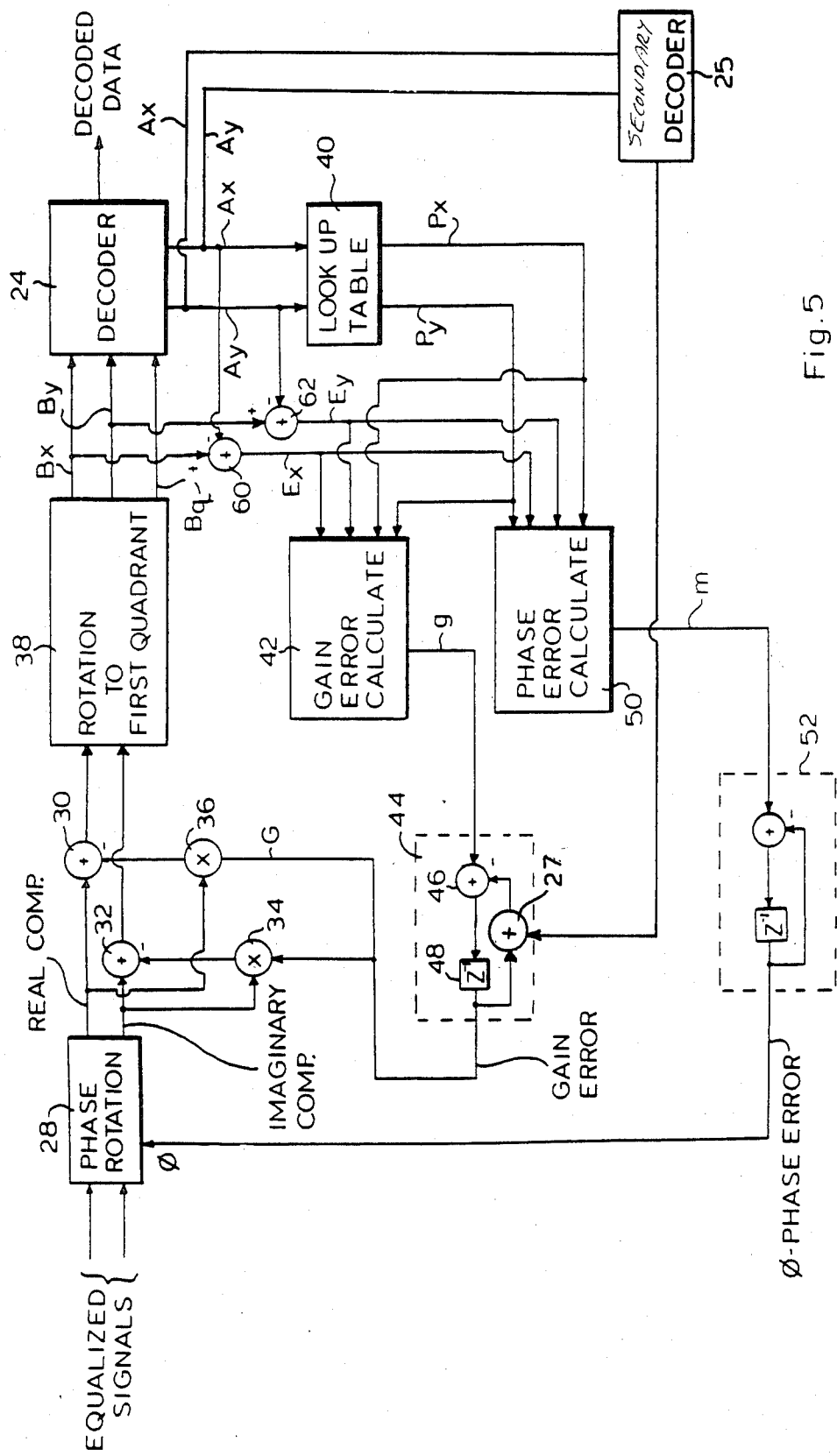
FIG. 5 shows details of the receiver modem of FIG. 1.

A means of implementing the phase and gain error circuits is shown in FIG. 5. The real and imaginary components of the equalized signals from equalizer 18 are fed to a phase rotation circuit 28. Circuit 28 rotates the equalized signals by an angle 0. The real and imaginary components of the rotated signals are fed respectively to summers 30 and 32, and to multipliers 34 and 36 as shown. In multipliers 34 and 36 the respective components are multiplied by the gain error signal G and the respective products are then subtracted from the equalized components by summers 30 and 32 respectively. The outputs of summers 30 and 32 comprise the gain-corrected real and imaginary components of the signals and they are fed into a circuit 38 provided to rotate said signals to the first quadrant. Circuit 38 has three outputs, the first quadrant real and imaginary components of the rotated signals and a signal indicative of the original input signals received from summers 30 and 32. For example if the input to circuit 28 is signal $-3-4j$, then $B_x=3$; $B_y=4$ and $B_q=3$ (indicating a signal in the third quadrant). These signals are fed to decoder 24 which recognizes the received signal B as corresponding to ideal signal A because it (signal B) lies within the decision area 31 of FIG. 2. In response to the input signals, the decoder 24 generates a stream of data bits in accordance with the preselected encoding scheme used by transmit modem 10. The method of operation of decoder 24 is well known in the art and need not be described in more detail. The decoder also provides the real and imaginary components of ideal vector A, i.e. $A_x$ and $A_y$ to a look-up table 40 which in response generates corrector constants $P_x$ and $P_y$ defined above. Alternatively $P_x$ and $P_y$ may be calculated by using their formulas (9) and (10) however it was found that the use of look-up tables is more efficient.

The real and imaginary equalizer error components, $E_x$ and $E_y$ respectively, are computed via subtractors 60 and 62 in accordance with equation (1) and (2).

Constants $P_x$ and $P_y$ and the error signals $E_x$ and $E_y$ are fed to a gain error calculate circuit 42 which calculates an instantaneous gain error g in accordance with equation (7).

Figure 6:
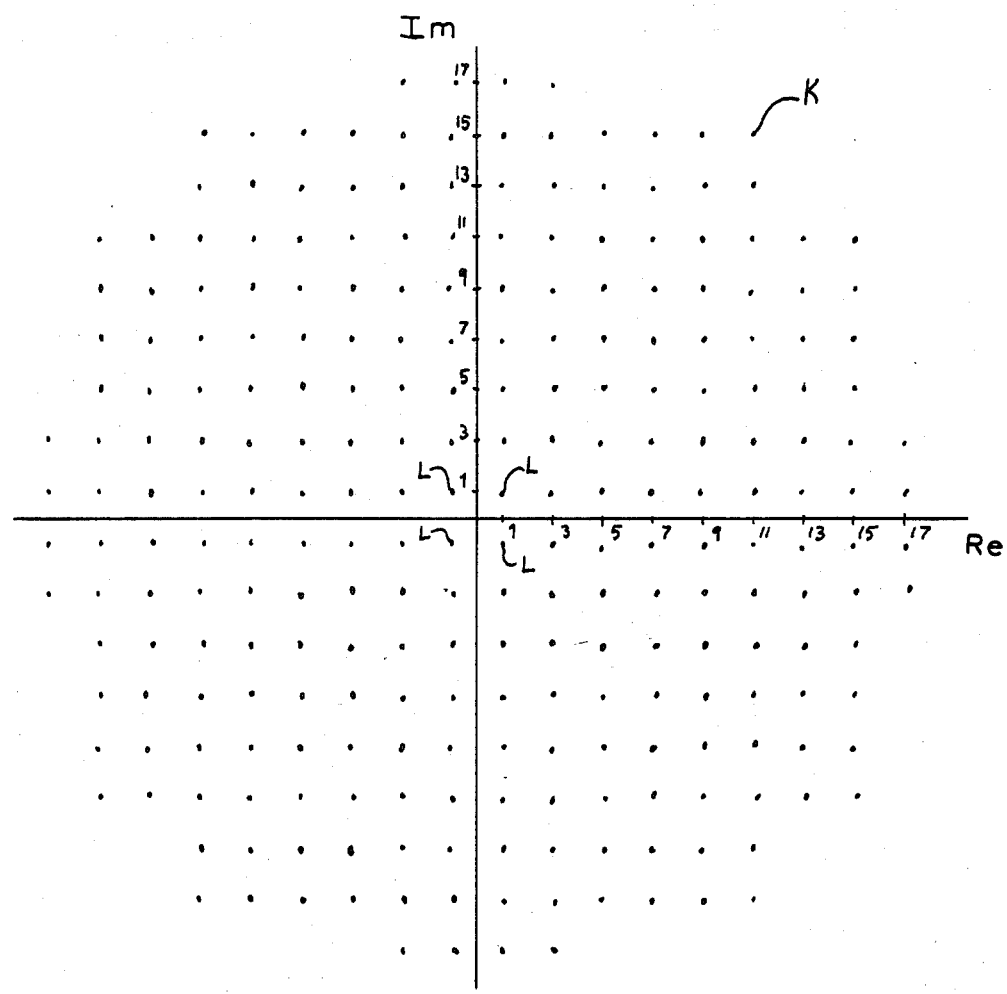
FIG. 6 shows the signal points of a QAM constellation which may be used to track gain hits according to this invention.

The modem components of FIG. 5 described so far have also been described and claimed in copending commonly owned U.S. application Ser. No. 678,652 filed December 6, 1984 by the present inventors and entitled "Gain Tracker for Digital Modems". In addition, in the present invention, the ideal vector components from decoder 24 are also fed to a secondary decoder 26. This secondary decoder determines whether a particular received point is an extreme point or not as follows. In FIG. 6 a signal constellation is shown with 256 points. For the secondary detector an outermost point may be defined as point K, i.e. a point having the coordinates 11, 15 in the first quadrant. Similarly, the innermost point L may be point 1, 1. For each received signal, the secondary detector 26 generates a signal W. If an outer point K is detected then $W = -1$, for an inner point L, $W = 1$ and for all other points, $W = 0$.

The instantaneous gain error g is fed to an integrator circuit 44 provided to smooth the instantaneous gain. The integrator circuit comprises a first summer 46, a second summer 27 and a sample-and-hold element 48. The output of the sample-and-hold element is added to the output W of secondary decoder in summer 27. The output of summer 27 is used as a negative feed-back to summer 46 as shown. The integrated gain error signal G is used as one of the inputs of multipliers 34 and 36, as previously described and is automatically adjusted for hit gains by variable W.

In addition, $E_x$, $E_y$, $P_x$, and $P_y$ as described in the previous application identified above may also be fed to phase calculate circuit 50 which calculates the instantaneous phase error m in accordance with equation (8). A second integrator 52 is used to smooth the output m of circuit 50. The output 0 of the integrator 52 is used to correct the phase of the equalized signals in circuit 28 as previously described.

Thus the circuit shown in FIG. 5 generates an error signal by comparing the actual signals to ideal vectors. The error signal has a radial component used for gain correction and a tangential component used for error correction. The circuit also detects inner and outer received signal points and modifies the gain of the circuit accordingly. The circuit was found to be particularly well suited for modems using forward error correction because the number of erroneous decisions made by such modems due to gain hits was reduced.

The transmitter and receiver modems may also include a randomizer and derandomizer respectively to insure that signals corresponding all the points of the signal constellation are transmitted with an even distribution.

It is clear that one skilled in the art could perform numerous modifications and additions to the invention as described above without departing from its scope as defined in the appended claims.

We claim:

1. In a modem for receiving a QAM encoded data signal which corresponds to a received vector, and having a decoder adapted to generate an ideal vector corresponding to said received vector, said ideal vector defining a point of a signal constellation, an error corrector comprising:

means for obtaining the radial component in the direction of said ideal vector of an error vector, said error vector being a difference vector between said received and ideal vectors;

means for obtaining an instantaneous gain error signal determined by said radial component;

a secondary detector for generating an adjustment signal when said ideal vector corresponds to an extreme point of said signal constellation;

adjustment means responsive to said adjustment signal for modifying said instantaneous gain error signal to generate a final gain error signal; and means for modifying said received vector in accordance with said final gain error signal and wherein said instantaneous gain error signal is given by gain error signal $g = E_x P_x - E_y P_y$ where $E_x$ and $E_y$ are the real and imaginary components of the error vector;

$P_x = \cos s$;

$P_y = \sin s$;

s being an instantaneous phase angle of the ideal vector.

2. The error corrector of claim 1 wherein said instantaneous gain signal is modified by an adjustment signal W, said signal W having a first value when said secondary detector detects an ideal sector corresponding to an outermost point of said signal constellation and a second value when said secondary detector detects an ideal vector corresponding to an innermost point of said signal constellation.

3. The error corrector of claim 1 wherein a phase error signal is given by:

phase error signal $= E_y P_x + E_x P_y$.

* * * * *